J. C. MULLER.
DUST COLLECTOR.
APPLICATION FILED JUNE 9, 1917.
1,288,126.
Patented Dec. 17, 1918.
3 SHEETS—SHEET 1.
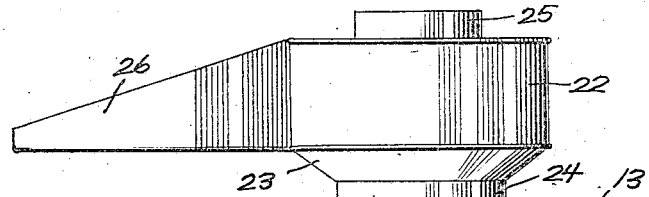
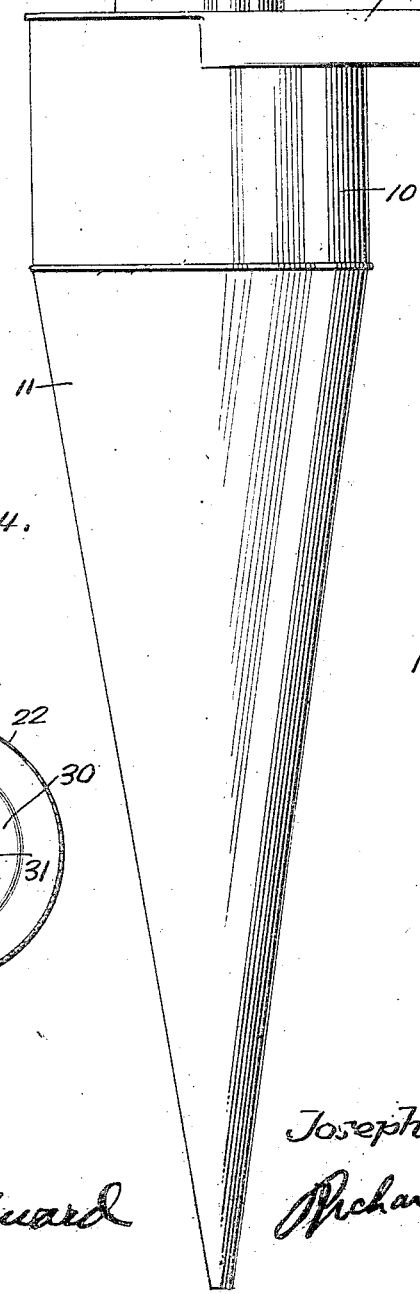
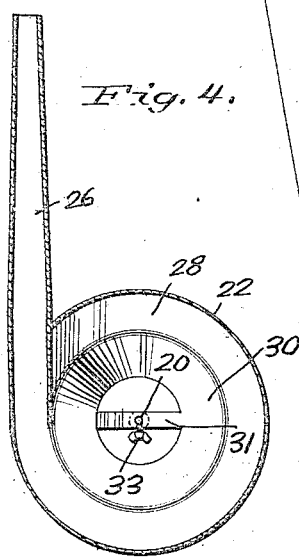
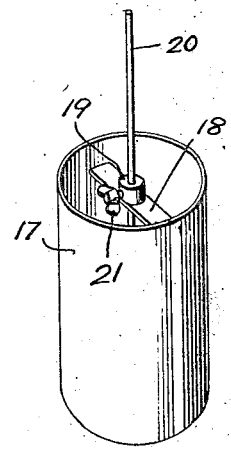
WITNESSES
INVENTOR
Joseph C. Muller,
ATTORNEY

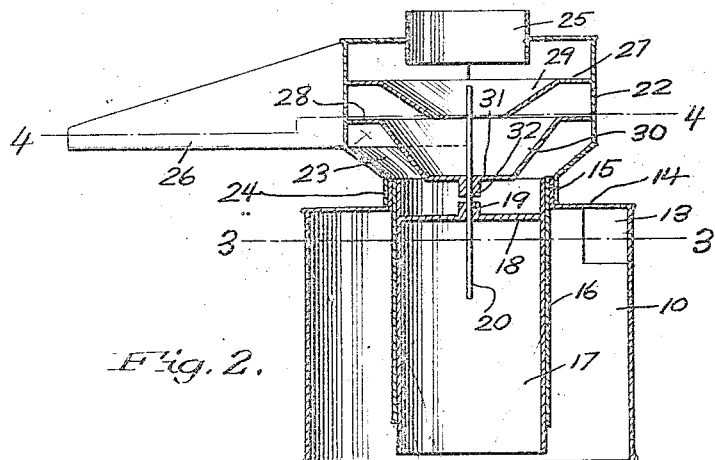
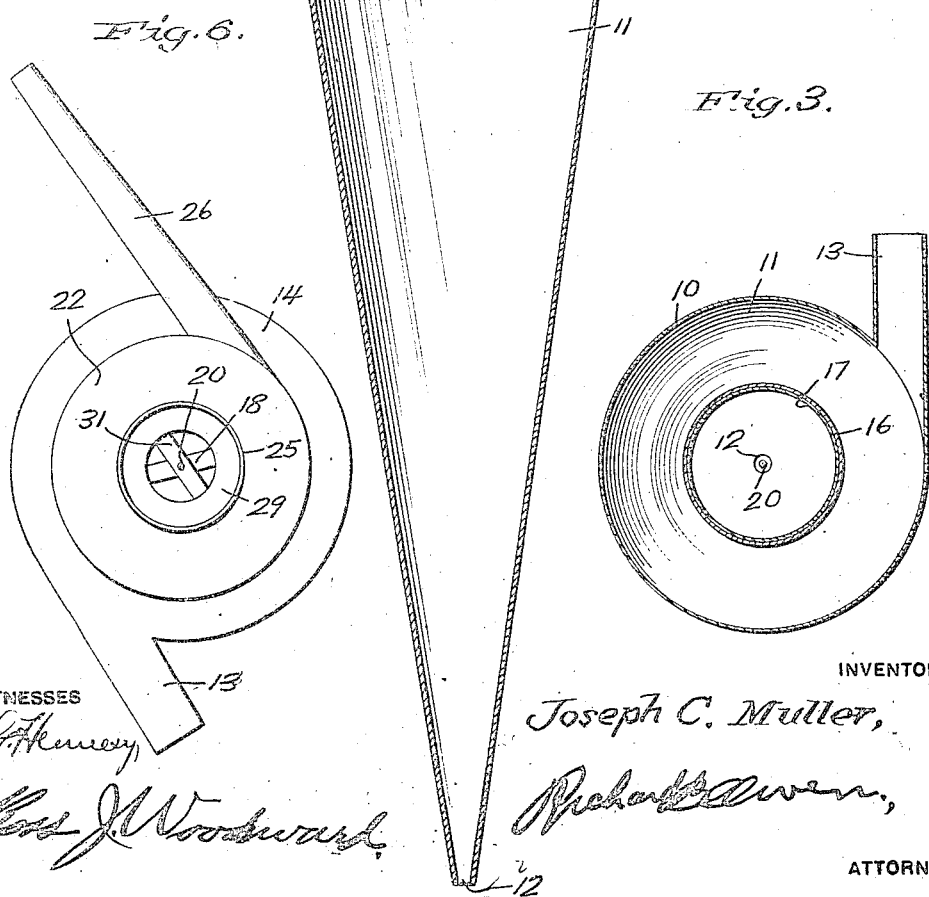

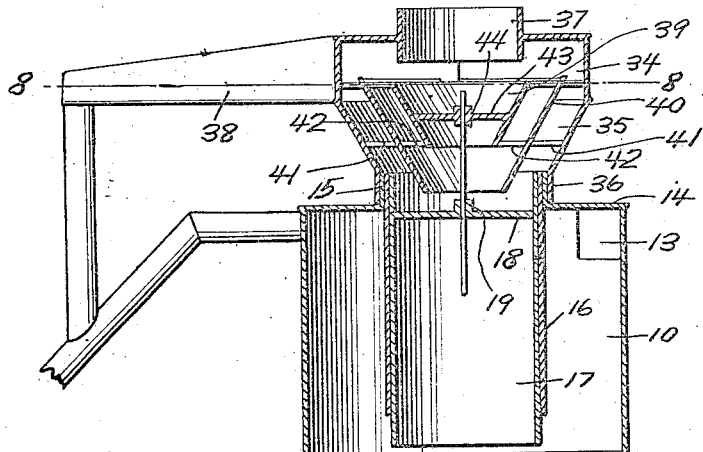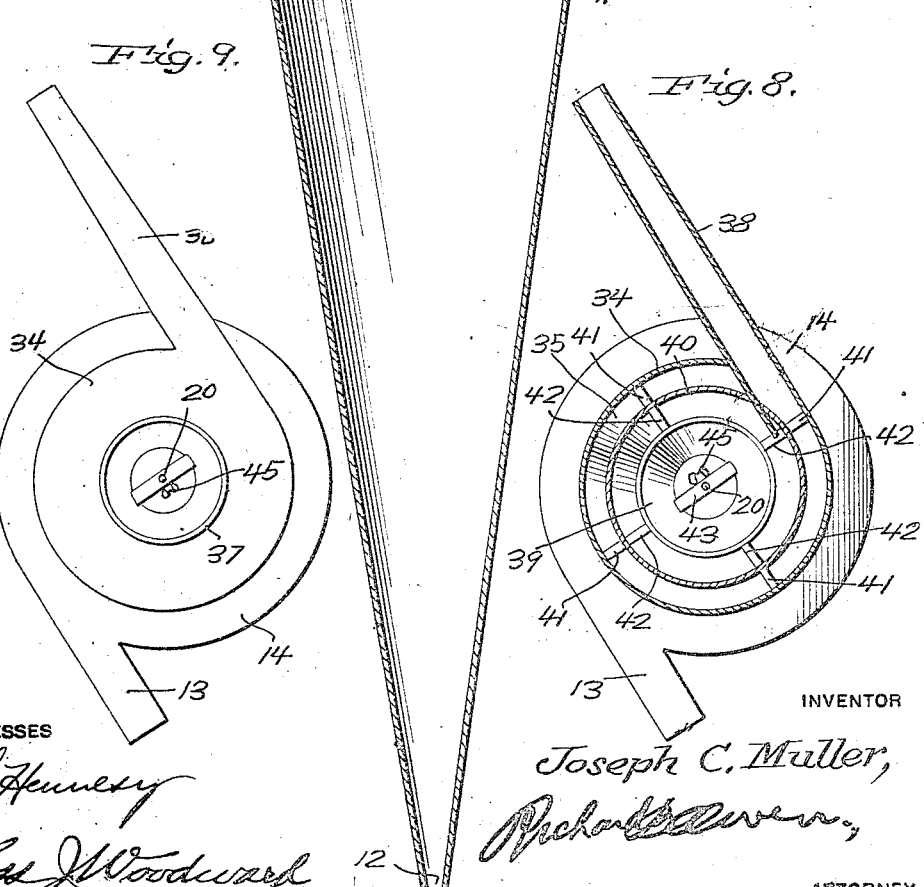

UNITED STATES PATENT OFFICE.

JOSEPH C. MULLER, OF FERDINAND, INDIANA.

DUST-COLLECTOR.

1,288,126.

Specification of Letters Patent.

Patented Dec. 17, 1918.

Application filed June 9, 1917. Serial No. 173,816.

*To all whom it may concern:*

Be it known that I, JOSEPH C. MULLER, a citizen of the United States, residing at Ferdinand, in the county of Dubois and State of Indiana, have invented certain new and useful Improvements in Dust-Collectors, of which the following is a specification.

This invention relates to an improved dust separator and the principal object of the invention is to provide an improved type of dust separator whereby air laden with dust may be passed into the body of the separator and directed through the upper portion thereof in a circular or spiral course, the major portion of the foreign matter being left in the body and passing out through the lower end thereof.

Another object of the invention is to provide an improved head for the body serving to separate the surplus dust from the air and permitting the pure air to pass out through the open upper end of the head and causing the dust and a portion of the air to be drawn through an outlet arm and return to the fan feeding dust laden air into the separator.

Another object of the invention is to so construct this head that the baffle plates mounted therein will be firmly held in place and to further so position the outlets for the air and surplus dust that the air will have a tendency to move in a spiral course through the head thus throwing the dust toward the walls of the head and permitting the pure air to pass out through the central outlet formed in the upper wall of the head.

Another object of the invention is to so construct this head that it may be removed from the body of the separator when so desired.

Another object of the invention is to provide a separator which will be very efficient in operation and which will be comparatively simple in construction.

This invention is illustrated in the accompanying drawings, wherein:—

Figure 1 is a view showing the improved separator in side elevation,

Fig. 2 is a vertical sectional view through the improved separator,

Fig. 3 is a transverse sectional view taken along the line 3—3 of Fig. 2,

Fig. 4 is a transverse sectional view taken along the line 4—4 of Fig. 2,

Fig. 5 is a perspective view of a sleeve having connection with the head of the separator, Fig. 6 is a top plan view of the improved separator, Fig. 7 is a view similar to Fig. 2 showing a slightly modified form of head for the separator, Fig. 8 is a transverse sectional view taken along the line 8—8 of Fig. 7, and Fig. 9 is a top plan view of the form of separator shown in Fig. 7.

This dust separator is provided with a housing or body 10 having a tapered or conical lower portion 11 terminating at its lower end in an outlet opening 12 through which material separated from the air is to pass. The inlet neck or pipe 13 communicates with the upper portion of the body at an angle thereto as shown in Figs. 3 and 6 so that the air driven into the separator from a fan by a suitable conduit will enter the body and have a tendency to pass about the same in a circular or spiral course. This inlet 13 communicates with the body at a point close to the head 14 of the body and in fact the upper wall of this conduit may be a continuation of the head as shown in Fig. 6. This head 14 is provided with a central opening from which extends a collar or neck 15 and in which there will be secured the inwardly extending sleeve 16 about which the air entering through the inlet 13 will pass. The pipe or sleeve 17 shown in Fig. 5, fits within the sleeve 16 and from an inspection of Fig. 2, it will be seen that this pipe 17 extends beneath the lower edge of the sleeve 16 and to a point adjacent the upper end of the tapered portion 11 of the body. It will thus be evident that before the air can pass up through the pipe or sleeve 17, it must pass down through the upper portion of the body. In doing so, the greater portion of the dust and other foreign matter contained in the air will be forced by the centrifugal force of rotation toward the sides of the body and will pass down the conical portion 11 of the body and out through the outlet 12. In the upper portion of this pipe or sleeve 17, there is provided a bridge 18 having a bearing 19 positioned in the center thereof to receive the rod 20, a set screw 21 being provided to releasably hold the rod in place. As far as described, the dust collector shown in Figs. 7, 8 and 9 is of the same construction as that shown in Figs. 1, 2, 3, 4, 5 and 6 and therefore the same reference numerals have been used.

The head or hood 22 is provided with a tapered lower portion 23 terminating in a neck 24 fitting upon the collar 15. This head or hood is provided with an outlet neck 25 extending above and below the upper wall of the hood as shown in Fig. 2 and is further provided with a tapered outlet pipe 26 which leads from the side wall of the hood so that air exhausted from this hood through the pipe 26 will have a tendency to suck the air through the hood in a spiral course. Within the hood there have been provided upper and lower baffle plates 27 and 28, the central portions 29 and 30 of which are conical. These baffle plates are provided with central air passages shown in Figs. 2 and 6 and the lower plate is provided with a bridge 31 upon which there is formed a bearing 32 to receive the rod 20. A set screw 33 may be provided for this bearing to engage the rod 20 and serve as additional means for securing the rod. It will be seen that when this rod is secured, the head will be held upon the body and prevented from having movement.

When in use, the air passes into the body through the inlet 13 and after passing around the sleeve 16 enters the pipe 17, the majority of the dust and other foreign matter in the air having collected against the walls of the body and pass down through the body and out through the outlet 12. This air together with the surplus dust enters the head and due to the suction through the outlet 26 passes around the head in a circular course. The dust will move toward the walls of the head and will pass out through the outlet 26 and will return to the fan through the means of a suitable conduit not shown. The pure air will pass up between the baffle plates and out through the outlet neck 25. It should be noted that this outlet neck extends into the head so that there will be no danger of any dust passing out through the outlet with the pure air.

In Figs. 7, 8 and 9 there is shown a slightly modified form of head. This head 34 is very similar to the head 22 and is provided with a tapered lower portion 35 terminating in a neck 36 for fitting upon the collar 15. This head is further provided with an outlet neck 37 for the pure air which neck extends into the head and the head is also provided with a return pipe 38 corresponding to the return pipe 26. This outlet pipe 38 or its equivalent 26, may be connected with the fan in communication with the inlet 13 by a suitable conduit 50, and air containing surplus dust will thus be returned to the fan and driven back into the dust separator. It will thus be seen that a common fan may serve as means for driving air into the separator through the inlet 13 and for removing dust laden air from the hood through the pipe 38. It will be noted, however, that the tapered portion 35 is deeper than the tapered portion 23 and is further pitched at a steeper angle. In this form, the baffle plates 39 and 40 which correspond to the baffle plates 27 and 28 are in the shape of inverted cones and are positioned in the head as shown in Fig. 7, with the baffle 40 held in place by rods or arms 41 leading to the tapered portion of the head and the baffle 39 being held in place within the baffle 40 by the rods or arms 42. It will be noted that in this form, the lower portion of the baffle 40 extends into the pipe or sleeve 17 and it will be further noted that instead of having the lower baffle provided with a bridge and baffle to receive the rods 20, the upper baffle has been provided with the bridge 43 corresponding to the bridge 31 and provided with a bearing 44 corresponding to the bearing 32. A set screw 45 may be provided for this bearing to engage the rod and secure the rod in the bearing. The operation of this form will be the same as in the form already described and therefore does not need to be repeated. It will thus be seen that I have provided a very efficient dust collector and further have provided one which will be comparatively simple in construction. It will be further noted that if it is desired to thoroughly clean the dust collector, the head can be easily and quickly removed from the body and easy access had to the interior of both.

What is claimed is:—

1. A dust collector comprising a hollow body portion provided with an opening in the upper end thereof, a sleeve disposed in said body and having its upper end fitted in said opening, a bridge member extending across said sleeve and provided with a bearing, a hood supported upon the upper end of said body and surrounding said sleeve, a plurality of baffles arranged in said hood, a bridge member extending across one of said baffles and provided with a bearing in alinement with the bearing in said first mentioned bridge member, and a removable fastening rod extending through said alined bearings and secured to retain the hood upon the body.

2. A dust collector comprising a hollow body having an opening in the upper end thereof, a hood removably secured upon the upper end of said body and surrounding said opening, said hood having conduits opening respectively into the top and sides thereof, and a plurality of inverted baffle cones arranged in said hood, each of said cones being provided with a central opening in alinement with the conduit in the top of the hood and with a tapering side wall adapted to deflect a portion of the air passing through the body toward the conduit opening into the side of the hood.

3. A dust collector comprising a hollow body portion closed at its upper end and provided with a central opening, a sleeve fitted in said openings, a hood supported upon the closed end of said body portion and surrounding said sleeve, outlet conduits leading respectively from the top and side walls of said hood, baffle plates arranged within the hood and shaped to deflect a portion of the air passing therethrough outwardly through the conduit leading from the side wall of the hood, and means for removably securing one of said baffle plates to said sleeve for the purpose of holding the hood upon the body portion.

In testimony whereof I affix my signature in presence of two witnesses.

JOSEPH C. MULLER.

Witnesses:
CLAUDE LINDANER,
HERBERT QUANTE.